United States Patent
Chen et al.

(10) Patent No.: US 11,884,009 B2
(45) Date of Patent: Jan. 30, 2024

(54) 3D NANOFABRICATION BASED ON HYDROGEL SCAFFOLDS

(71) Applicants: The Chinese University of Hong Kong, Hong Kong (CN); Carnegie Mellon University, Pittsburgh, PA (US)

(72) Inventors: Shih-Chi Chen, Hong Kong (CN); Songyun Gu, Hong Kong (CN); Fei Han, Hong Kong (CN); Yongxin Zhao, Sewickley, PA (US); Aleksandra Klimas, Pittsburgh, PA (US)

(73) Assignees: The Chinese University of Hong Kong, Hong Kong (CN); Carnegie Mellon University, Pittsburgh, PA (US)

( * ) Notice: Subject to any disclaimer, the term of this patent is extended or adjusted under 35 U.S.C. 154(b) by 54 days.

(21) Appl. No.: 17/302,671

(22) Filed: May 10, 2021

(65) Prior Publication Data
US 2022/0152924 A1    May 19, 2022

Related U.S. Application Data

(60) Provisional application No. 63/114,174, filed on Nov. 16, 2020.

(51) Int. Cl.
| | |
|---|---|
| *B29C 64/188* | (2017.01) |
| *B33Y 10/00* | (2015.01) |
| *B33Y 30/00* | (2015.01) |
| *B29C 64/106* | (2017.01) |
| *B33Y 70/00* | (2020.01) |
| *B29C 64/35* | (2017.01) |
| *B33Y 40/20* | (2020.01) |
| *B29C 64/268* | (2017.01) |
| *B29K 105/00* | (2006.01) |

(Continued)

(52) U.S. Cl.
CPC ......... *B29C 64/188* (2017.08); *B29C 64/106* (2017.08); *B29C 64/268* (2017.08); *B29C 64/35* (2017.08); *B33Y 10/00* (2014.12); *B33Y 30/00* (2014.12); *B33Y 40/20* (2020.01); *B33Y 70/00* (2014.12); *B29C 64/124* (2017.08); *B29K 2105/0061* (2013.01); *B33Y 40/00* (2014.12)

(58) Field of Classification Search
CPC ..... B29C 64/188; B29C 64/35; B29C 64/106; B29C 64/268; B29C 64/124; B33Y 10/00; B33Y 30/00; B33Y 40/00; B33Y 40/20; B33Y 70/00; B29K 2105/0061
USPC ....................................................... 264/482
See application file for complete search history.

(56) References Cited

U.S. PATENT DOCUMENTS

| | | | |
|---|---|---|---|
| 2008/0151238 A1 | 6/2008 | Zhu et al. | |
| 2017/0081489 A1* | 3/2017 | Rodriques | .............. C08J 3/28 |
| 2019/0126537 A1* | 5/2019 | Saha | .............. G03F 7/7085 |

OTHER PUBLICATIONS

Oran et al., "3D Nanofabrication by Volumetric Deposition and Controlled Shrinkage of Patterned Scaffolds", Science 362, 1281-1285, publ. Dec. 14, 2018 (Year: 2018).*

(Continued)

*Primary Examiner* — Joseph S Del Sole
*Assistant Examiner* — Lawrence D. Hohenbrink, Jr.
(74) *Attorney, Agent, or Firm* — Schwegman Lundberg & Woessner, P.A.

(57) ABSTRACT

The disclosure relates to a method or a platform for hydrogel-based 3D fabrication, wherein the hydrogel is patterned with a programmable femtosecond light sheet with a power density of 0.1 to 100 TW/cm$^2$.

10 Claims, 4 Drawing Sheets

(51) Int. Cl.
  *B29C 64/124*   (2017.01)
  *B33Y 40/00*   (2020.01)

(56) References Cited

OTHER PUBLICATIONS

Saha et al. "Scalable Submicrometer Additive Manufacturing", Science 366, 105-109, publ. Oct. 4, 2019 (Year: 2019).*
Jiang, L. J., et al., "Direct writing target structures by two-photon polymerization", Fusion Science and Technology 70.2, (2016), 295-309.
Kawata, Satoshi, et al., "Finer features for functional microdevices", Nature 412.6848, (2001), 697-698.
Oran, Daniel, et al., "3D nanofabrication by volumetric deposition and controlled shrinkage of patterned scaffolds", Science 362.6420, (2018), 1281-1285.
Saha, Sourabh K., et al., "Scalable submicrometer additive manufacturing", Science 366.6461, (2019), 105-109.
Zhu, Guanghao, et al., "Simultaneous spatial and temporal focusing of femtosecond pulses", Optics express 13.6, (2005), 2153-2159.

* cited by examiner

3D NANOFABRICATION BASED ON HYDROGEL SCAFFOLDS

CROSS-REFERENCE TO RELATED APPLICATION

This application claims priority of U.S. provisional application No. 63/114,174, the content of which is incorporated herein by reference in its entirety.

TECHNICAL FIELD

The disclosure relates to a method and a platform for the additive manufacturing. In particular, the disclosure relates to a method and a platform for 3D nano-fabrication via hydrogel scaffolds.

BACKGROUND

A hydrogel-based 3D additive manufacturing method, termed "implosion fabrication" (ImpFab), was first reported in 2018. It uses hydrogel as a medium to fabricate nanostructures with high resolution. Hydrogel and dye molecules with pre-designed structures are chemically bonded via optical treatment, and the dyes can further bond with certain nanoparticles to capture them within the hydrogel. The hydrogel is then shrunk to compress the attached materials, giving nanostructures with elevated structural precision. While the process of hydrogel 3D nano-printing has been established, there are several critical drawbacks that limit its applications, for example, (1) limited material choices as they have to be pre-designed to chemically bond with the hydrogel and the binding agents; (2) complicated and lengthy fabrication processes caused by the binding agents; and (3) low fabrication throughput caused by the point-scanning system and the shrink of gels.

There is still a need to develop a generalized method and platform to overcome at least one of the existing drawbacks.

SUMMARY

In an aspect, the disclosure provides a method for hydrogel-based 3D fabrication, comprising: patterning a hydrogel with a laser with a power density of 0.1 to 100 $TW/cm^2$; depositing and absorbing a material on the modified hydrogel; shrinking and dehydrating the hydrogel before or after material deposition, thereby producing a three-dimensional structure.

In some embodiments, the method further comprises producing the hydrogel from a compound selected from the group consisting of acrylate (such as sodium acrylate), methacrylate, acrylamide (such as N,N-dimethyl acrylamide), hyaluronic acid, gelatin and a derivative thereof. In some embodiments, the method further comprises sintering the hydrogel which has been shrunk and dehydrated by photon sintering. In some embodiments, the photon sintering may be conducted with a laser with a power density of 0.1 to 100 $TW/cm^2$. In some embodiments, the photon sintering may be conducted with a light sheet with a power density of 0.1 to 100 $TW/cm^2$.

In some embodiments, the hydrogel is patterned with a laser with a power density of 0.1 to 100 $TW/cm^2$. In some embodiments, the hydrogel is patterned with a light sheet with a pulse width of 200 fs or less. In some embodiments, the laser for patterning the hydrogel may have a wavelength of 800 nm or higher and a pulse width of 200 fs or less. In some embodiments, the laser may be applied at a fabrication rate of $10^7$ $\mu m^3/s$ or higher.

In some embodiments, before the patterning, the hydrogel may be trimmed and expanded with pure water or a solution with pH>7 to possess the similar structure as the three-dimensional structure. In some embodiments, the hydrogel which has been deposited with the material may be intensified by applying an extra layer of metal onto the surface of the existing material. In some embodiments, the metal may be selected from the group consisting of silver, gold, platinum, copper and a combination thereof.

In some embodiments, the material that is deposited and absorbed onto the hydrogel is a material with a largest particle size of 30 nm or less. In some embodiments, the material may be selected from the group consisting of a metal, a metal oxide, a metal alloy, a carbon-based material, a biological material, a molecular crystal, a two-dimensional material, a salt, an ionic liquid, a macromolecule material, a dye, and a combination thereof. For example, the material may be selected from a nanoparticle, a quantum dot, a nanocrystal, a nanorod, a nanoflake, a nanotube, a protein, DNA, graphene, a biological macromolecule and a combination thereof.

In some embodiments, the hydrogel which has been deposited with the material may be washed and then subjected to the patterning step as described above or other patterning step. In some embodiments, the hydrogel which has been deposited with the material may be washed and then subjected to the patterning step wherein a different material may be deposited and absorbed onto the hydrogel.

In some embodiments, the hydrogel may be shrunk and dehydrated by washing with a dilute acid solution, dehydrated in an alcohol and dried in air or in an oven at 30-70° C. In some embodiments, the hydrogel may be shrunk and dehydrated by washing with PBS solution, then washing with an aqueous solution of NaCl, $MgCl_2$ or $CaCl_2$, dehydrated in an alcohol and dried in air. In some embodiments, the hydrogel may be shrunk and dehydrated by washing with a soluble compound that can change the osmotic pressure (such as PEG-8000, PEG-400 or any other polyethylene glycerol derivatives) and NaCl solution. In some embodiments, the hydrogel may be shrunk and dehydrated by directly placed in open air. In some embodiments, the hydrogel may be shrunk and dehydrated by washing with water doped alcohol, then washing with an alcohol and dried in air. In some embodiments, the hydrogel may be shrunk and dehydrated by any combination of the aforementioned steps, or other conventional procedures in the art.

In some embodiments, the above steps of material deposition and hydrogel dehydration can be switched. For example, the hydrogel may be firstly shrunk and dehydrated by any combination of the aforementioned steps, or other conventional procedures in the art, and then deposited with any of the materials described above.

In another aspect, the disclosure provides a platform for hydrogel-based 3D fabrication, comprising: a patterning system, which patterns hydrogel with a laser with a power density of 1 to 100 $TW/cm^2$; a deposition system, wherein a material is adsorbed and deposited on the patterned hydrogel; a forming system, wherein the hydrogel before or after material deposition is shrunk and dehydrated, thereby producing a three-dimensional structure.

In some embodiments, the platform further comprises a hydrogel-generation system, and the hydrogel-generation system may produce the hydrogel from a compound selected from the group consisting of acrylate (such as sodium acrylate), methacrylate, acrylamide (such as N,N-dimethyl acrylamide), hyaluronic acid, gelatin and a derivative thereof. In some embodiments, the platform further comprises a sintering system, and the sintering system may sinter the hydrogel which has been shrunk and dehydrated by photon sintering. In some embodiments, the photon sintering may be conducted with a laser with a power density of 0.1 to 100 $TW/cm^2$.

In some embodiments, the patterning system comprises a femtosecond laser amplifier, and the femtosecond laser amplifier may provide a laser with a power density of 0.1 to 100 $TW/cm^2$. In some embodiments, the femtosecond laser amplifier provides a light sheet with a pulse width of 200 fs or less. In some embodiments, the laser for patterning the hydrogel may have a wavelength of 600-1200 nm (e.g., 800 nm) or higher and a pulse width of 200 fs or less. In some embodiments, the laser may be applied at a fabrication rate of $10^7$ $\mu m^3/s$ or higher.

In some embodiments, before patterning the hydrogel, the hydrogel may be trimmed and expanded with pure water or a solution with pH>7 to possess the similar structure as the three-dimensional structure. In some embodiments, the hydrogel which has been deposited with the material may be intensified by applying a layer of metal onto a surface of the hydrogel and the material. In some embodiments, the metal may be selected from the group consisting of silver, gold, platinum, copper and a combination thereof.

In some embodiments, the material that is deposited and absorbed onto the hydrogel is a material with a largest size of 30 nm or less. In some embodiments, the material may be selected from the group consisting of a metal, a metal oxide, a metal alloy, a carbon-based material, a biological material, a molecular crystal, a two-dimensional material, a salt, an ionic liquid, a macromolecule material, a dye, and a combination thereof. For example, the material may be selected from a nanoparticle, a quantum dot, a nanocrystal, a nanorod, a nanoflake, a nanotube, a protein, DNA, graphene, a biological macromolecule and a combination thereof.

In some embodiments, the hydrogel which has been deposited with the material in the deposition system may be washed and then transported to the patterning system. In some embodiments, the hydrogel which has been deposited with the material in the deposition system may be washed and then transported to the patterning system wherein a different material may be deposited and absorbed onto the hydrogel.

In some embodiments, the hydrogel may be shrunk and dehydrated by washing with a dilute acid solution, dehydrated in an alcohol and dried in air or in an oven at 30-70° C. In some embodiments, the hydrogel may be shrunk and dehydrated by washing with PBS solution, then washing with an aqueous solution of NaCl, $MgCl_2$ or $CaCl_2$, dehydrated in an alcohol and dried in air. In some embodiments, the hydrogel may be shrunk and dehydrated by washing with a soluble compound that can change the osmotic pressure (such as PEG-8000 or PEG-400 or any other polyethylene glycerol derivatives) and NaCl solution. In some embodiments, the hydrogel may be shrunk and dehydrated by washing with water doped alcohol, then washing with an alcohol and dried in air. In some embodiments, the hydrogel may be shrunk and dehydrated by directly placed in open air. In some embodiments, the hydrogel may be shrunk and dehydrated by any combination of the aforementioned steps, or other conventional procedure in the art.

In some embodiments, the above steps of material deposition and hydrogel dehydration can be switched. For example, the hydrogel may be firstly shrunk and dehydrated by any combination of the aforementioned steps, or other conventional procedures in the art, and then deposited with any of the materials described above.

DESCRIPTION OF DRAWINGS

Embodiments illustrated herein are further described in the following description in conjunction with the accompanying drawings. However, the accompanying drawings are only provided to enable those skilled in the art to better understand the disclosure, rather than limit the scope of the disclosure.

DETAILED DESCRIPTION

Figure 1:
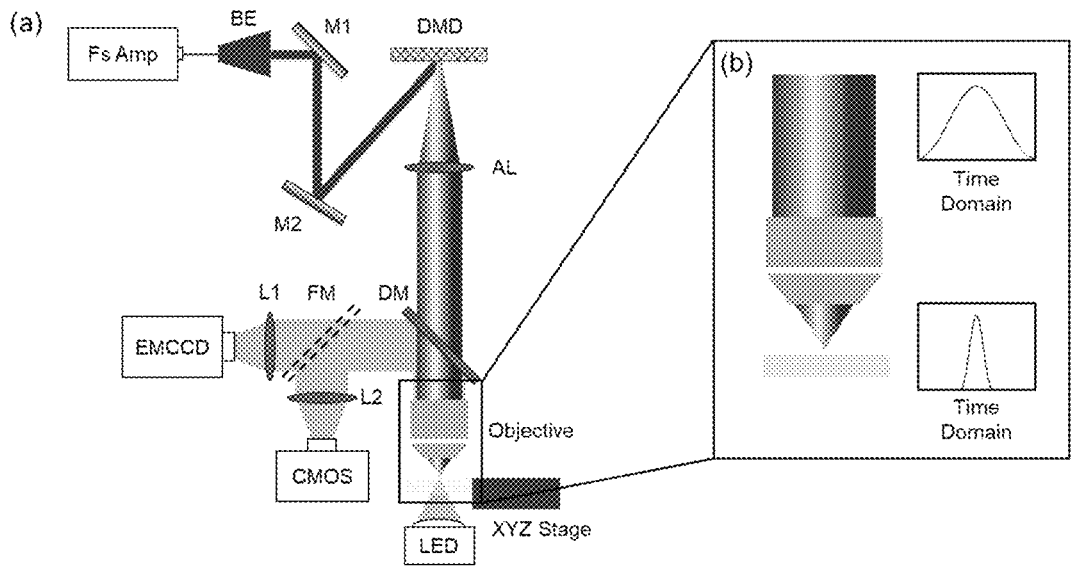
FIG. 1 shows a schematic drawing of a printing system according to an embodiment, wherein (a) presents an optical configuration of the SSTF-based multi-material hydrogel 3D printing system (BE: beam expander; M1-M2: mirrors; AL: achromatic lens; DM: dichroic mirror; FM: flip mirror; L1-L2: lens); (b) is an illustration of SSTF, wherein the spatially dispersed and temporally elongated beam is recombined at the focal plane of the objective.

The disclosure will be further illustrated by the following specific embodiments. However, the specific embodiments are listed for illustrative purposes only, and not intended to limit the disclosure. As will be appreciated by those skilled in the art, specific feature(s) according to any one of the following embodiments may be used in any other embodiments without deviating from the spirit of the disclosure.

One or more embodiments of the disclosure provides a high-throughput 3D nanofabrication method (such as a multi-material 3D nanofabrication method) by the use of programmable femtosecond light sheets and a new hydrogel-based 3D fabrication platform, that is, printing 3D structures in expanded hydrogels, followed by volume-shrinking to nano-scale. Although the existing ImpFab method provides a solution to create multi-material nanostructure, it requires complex procedures for material depositions, and applies only to gold and silver.

In this regard, the inventors found that the light sheets generated by a femtosecond laser amplifier with high peak energy can dramatically improve the adsorption characteristics of the hydrogels, leading to direct binding and printing of target materials without using binding agents, e.g., fluorescent dyes. The inventors further found that the femtosecond light sheets substantially improve the rate of pattern definition (for example, by at least 1000 times) in comparison to the conventional serial scanning two-photon processes.

One or more embodiments of the disclosure provides a method for hydrogel-based 3D fabrication, comprising: patterning a hydrogel with a laser with a power density of 0.1 to 100 TW/cm$^2$; depositing and absorbing a material on the patterned hydrogel, then shrinking and dehydrating the hydrogel which has been deposited with the material, or shrinking and dehydrating the hydrogel which is not deposited with the material, then depositing and absorbing the material on the patterned hydrogel, thereby producing a three-dimensional structure. One or more embodiments of the disclosure also provides a platform for hydrogel-based 3D fabrication, comprising: a patterning system, which patterns hydrogel with a laser with a power density of 1 to 100 TW/cm$^2$; a deposition system, wherein a material is deposited and absorbed on the patterned hydrogel; a forming system, wherein the hydrogel which is or not deposited with the material is shrunk and dehydrated, thereby producing a three-dimensional structure.

In some embodiments, the patterning system may comprise a femtosecond laser amplifier or any other device that can produce light sheets with high peak energy. Any forms of the light with high power density could be used in the patterning system of the disclosure instead of the light sheets. In some embodiments, the femtosecond laser amplifier may provide a laser with a peak power density of 0.1 to 100 TW/cm$^2$ for patterning the hydrogel. In some embodiments, the femtosecond laser amplifier may provide light sheets with peak power density of 1 to 50 TW/cm$^2$. In some embodiments, the peak power density may be 1, 5, 10, 15, 20, 25, 30, 35, 40, 45, 50, 60, 70, 80, 90 or 100 TW/cm$^2$.

The hydrogel-based 3D fabrication could be realized via a photo-chemical modification of hydrogels under the exposure of femtosecond laser at a peak power density above 0.1 TW/cm$^2$ (such as above 1 TW/cm$^2$). During high power illumination, the carboxyl group of a hydrogel can be modified, producing 3D patterns that selectively adsorb any particles smaller than 20 nm. As most hydrogels consists of subunits containing carboxyl groups or hydroxyl groups (e.g., acrylate, sodium acrylate and its derivatives, acrylamide or its derivative, hyaluronic acid, and gelatin), the method of the disclosure can be applied to most commercially available hydrogels. As such, by repeating the illumination-adsorption cycle, different target materials can be directly attached or anchored to the hydrogel scaffold, producing multi-material nanostructures. In principle, any molecules, ions, or nanoparticles with suitable sizes can be adsorbed and deposited in the hydrogels to form 3D nanostructures. In terms of throughput, the printing speed is enhanced by two to three orders of magnitude via femtosecond laser projection method, where programmable light sheets are generated by a digital micromirror device (DMD) via simultaneous spatial and temporal focusing (SSTF). Fabrication experiments have been performed to verify the hydrogel-based 3D fabrication platform of the disclosure.

For example, the printing system could be a custom-built fully automated SSTF two-photon 3D printer with precise dose control. FIG. 1(a) presents the optical configuration of the SSTF-based 3D printing system. A femtosecond laser amplifier (Spitfire Pro, Spectra Physics) is used as the laser source with a center wavelength of 800 nm and repetition of 1 kHz, which can provide a peak power up to 40 TW when its pulse is compressed to 100 fs. First, the laser beam diameter is appropriately expanded to fully fill the DMD aperture (e.g., DLP6500, 1080p, Texas Instruments) with a uniform beam profile. In the system, the DMD is positioned to be in conjugation with the focal plane of the objective lens, i.e., the build plane, to modulate the exposure pattern and simultaneously serves as a blazed grating to induce temporal focusing. After the DMD, the laser pulses are widened due to dispersion. Lastly, the objective lens recombines the spatially dispersed spectrum at the focal plane to form a femtosecond light-sheet with a thickness of approximately 1 micron, as illustrated in FIG. 1(b). The pattern of the light sheet can be arbitrarily modulated by the DMD. Axial scanning can be achieved by applying an additional scanning unit to the system, e.g., XYZ stage, electrical tunable lens, and piezoelectric objective scanner etc. To monitor the hydrogel printing process in situ, two cameras are used in this system, where the CMOS camera monitors the printing process via an illumination light source under the sample; and the EMCCD camera collects fluorescent signals from the patterned gels. The two imaging modes can be switched by a flip mirror.

In one or more embodiments, the platform of the disclosure comprises a hydrogel-generation system which produces the hydrogel. In one or more embodiments, the method of the disclosure comprises producing the hydrogel. For example, the hydrogels may be formed by two steps.

Step 1—Solution Preparation:

A solution containing monomer components such as N,N-dimethylacrylamide (DMAA), sodium acrylate (SA), and acrylamide (AA) combined with cross linker components such as N,N'-Methylenebisacrylamide (Bis) are mixed at concentrations optimized for sturdiness, expansion factor, and/or shrinking factor, e.g. 6% (w/v) DMAA, 34% (w/v) SA, 2.5% (w/v) AA, and 0.0025% (w/v) Bis.

Step 2—Hydrogel Gelation:

A gelling chamber is then constructed by using a glass slide with glass coverslip spacers on either end of the slide. Gelling solution is then prepared by adding a solution of the initiator ammonium persulfate (APS) or potassium persulfate to a final concentration of at least 0.2% (w/v). This solution is then added to the gelling chamber and a glass coverslip is used to close the chamber and the chamber containing gelling solution is then incubated overnight at 37°-45° C. in a humidified container to complete gelation.

Figure 2:
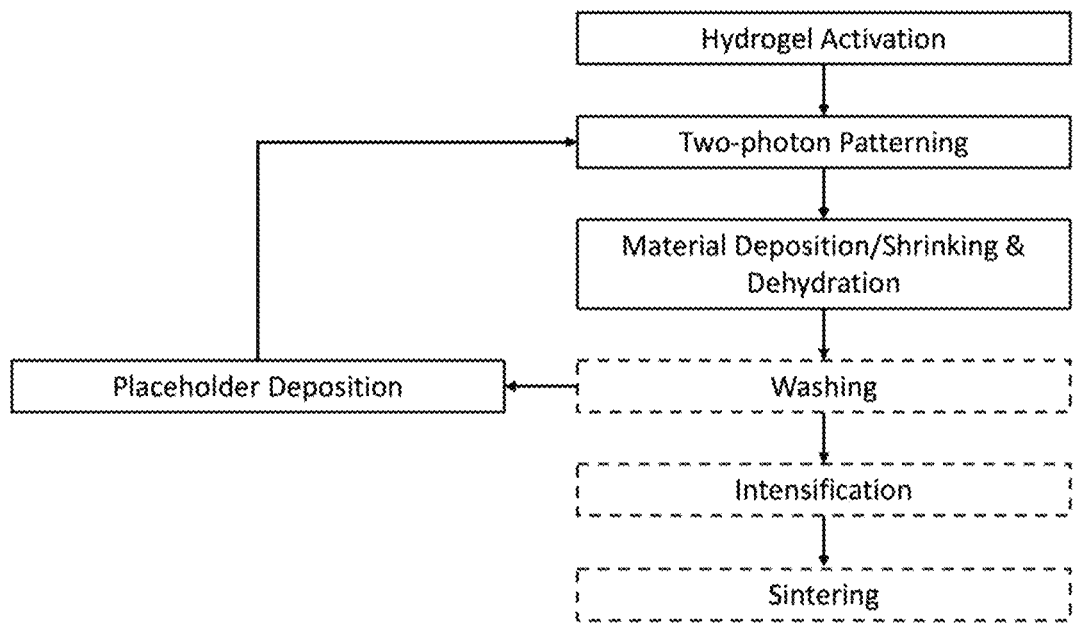
FIG. 2 is a processing flow for multi-material deposition in hydrogel based on the SSTF multi-material hydrogel 3D printing system.
Figure 3:
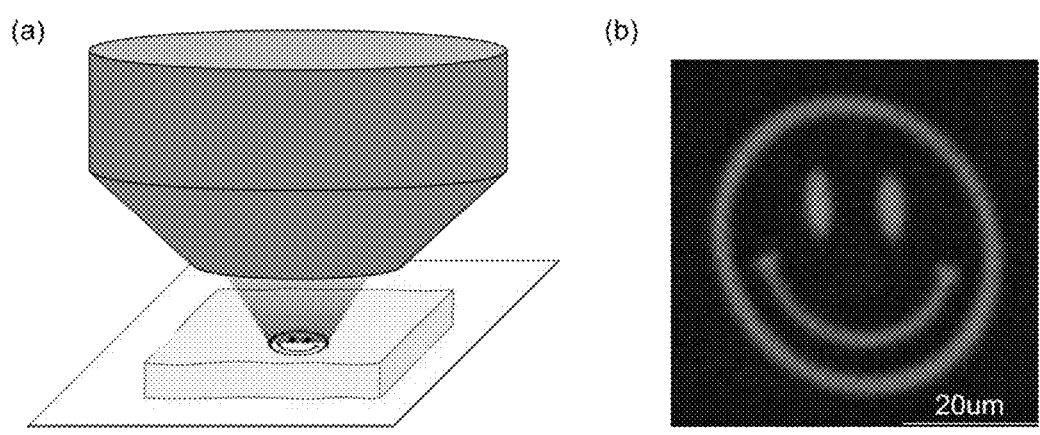
FIG. 3 shows a schematic patterning process, wherein (a) is an illustration of ultrafast pattern definition in hydrogel via femtosecond light sheets, where the patterned light sheet can be projected and focused at an arbitrarily selected depth inside the hydrogel; (b) shows fluorescent image of a smiley face pattern in the gel deposited with dyes.

As illustrated in FIG. 2, the method of the disclosure may comprise the following steps.

Step 1—Patterning of Hydrogel:

A piece of hydrogel is trimmed to the proper size and soaked in either pure water or an aqueous solution of base (e.g., 0.001-2 mM NaOH solution) for expansion. After one-hour incubation at room temperature, the remaining solution is removed. The expanded gel is then placed and fixed to a glass slide by pre-treating the slide with 0.1% poly-D-lysine solution. A cover glass is placed on top of the gel to slow down evaporation and prevent direct contact with the objective lens. Finally, a patterned femtosecond light sheet with a pulse width of 200 or less fs is projected to the gel at a fabrication rate of $10^7$ μm$^3$/s, creating 2D or 3D structural patterns for material adsorption. The material adsorption property is enabled by treating the gel with a (peak) laser power density between 0.1-100 TW/cm$^2$.

Step 2(i)—Material Deposition:

The patterned gel is transferred into an aqueous solution (or suspension) of target. Applicable nanomaterials include carbon materials, two-dimensional materials, metal or metal alloy, nanoparticles, quantum dots, nanocrystals etc. After 0.1-2 hours of incubation at room temperature, the remaining solution is removed. The hydrogel is then washed with water to remove the free and residual nanomaterials within the gel. To deposit different types of materials, steps 1 and 2 can be repeated on the same hydrogel.

To increase the density and conductivity of metal depositions, an optional intensification step can be applied upon completion of material deposition. For example, for gels deposited with metal nanoparticles, the gel is first washed with 50 mM EDTA at pH 5.5, and next immerse it in 2 mL silver or gold solution for an hour. Thus, a thin layer of silver or gold is formed on the surface of the metal depositions to form the metal depositions. To remove the excess silver ions, the gel is washed with water for 20 minutes, and then 50 mM sodium citrate for an hour.

Step 2(ii)—Shrinking and Dehydration

Hydrogels with different compositions can be shrunk via any of the following methods:

(a) For polyacrylate/polyacrylamide based gels: washing with 0.01-10 mM acid solution (e.g., HCl or acetic acid) in a glass chamber until the shrinkage stops; or washing 3 times in 10×PBS for 15 min, and then washing in 1M MgCl$_2$ 3 times for 15 min; or washing 1-3 times in 50% PEG-8000 and 1M NaCl; or washing 1-3 times in 80% PEG-400 and 1M NaCl; or washing 1-3 times in some concentration of any polyethylene glycerol derivative, or a combination of any aforementioned steps. Gels can then be dehydrated in ethanol or isopropanol or other water-immiscible organic solvents and then air-dried (b) For other types of gels: washing with water doped (50-75%) ethanol or isopropanol three times for 15 min, and then pure ethanol or isopropanol for two hours.

Step 3—Two-Photon Sintering

The dehydrated sample is placed on a substrate with the pattern facing up. A cover glass is placed on top of the gel to prevent direct contact with the objective lens. Bright field illumination is used to locate the pattern. Finally, a femtosecond light sheet with a pulse width of 100 fs is projected to the pattern at a fabrication rate of $10^7$ μm$^3$/s, with a (peak) laser power density between 0.1-100 TW/cm$^2$.

In one or more embodiments, a femtosecond light sheet-based ultrafast 2D pattern definition process is provided, which could provide sufficient laser power density and create arbitrary 3D structures in the expanded hydrogel.

Figure 4:
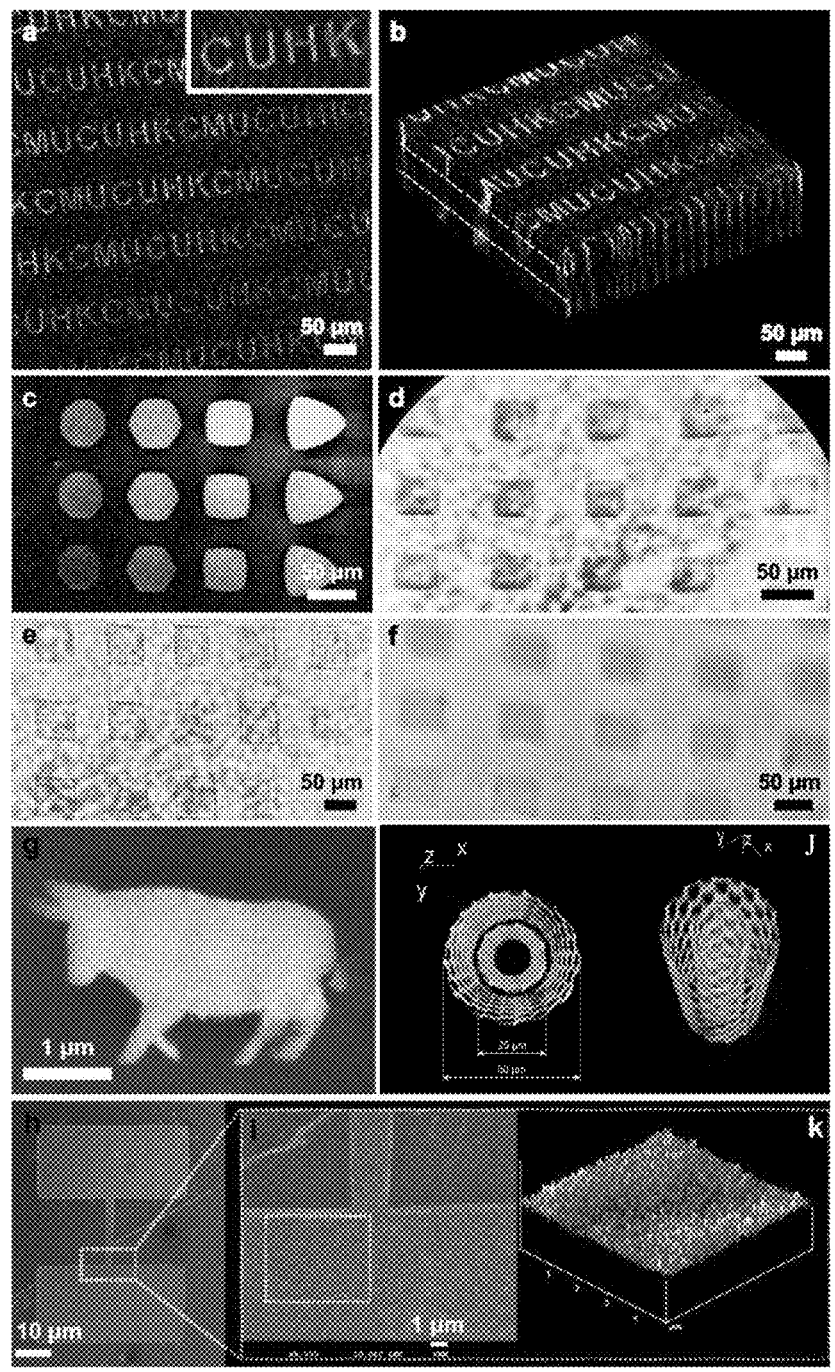
FIG. 4 shows printing of 2D/3D structures with different nanomaterials, wherein (a) shows fluorescence image of printed CUHK & CMU patterns of sulfur quantum dots; (b) shows printing of two layers of CUHK-CMU patterns that are 50 microns apart in the z direction (before shrinking); (c) shows fluorescence image of printed 2D patterns of fluoresce dyes; (d), (e) and (f) show optical images of printed square patterns of black ink, silver nanoparticles, and gold nanoparticles, respectively; (g), (h) and (i) show SEM images of a printed silver ox and a gold electrode (all with the shrinking of the hydrogel substrate); (j) shows a fluorescence image of printed 3D patterns of CdSe quantum dots; (k) shows an AFM image illustrating the surface roughness of the gold electrode in (h).
Figure 5:
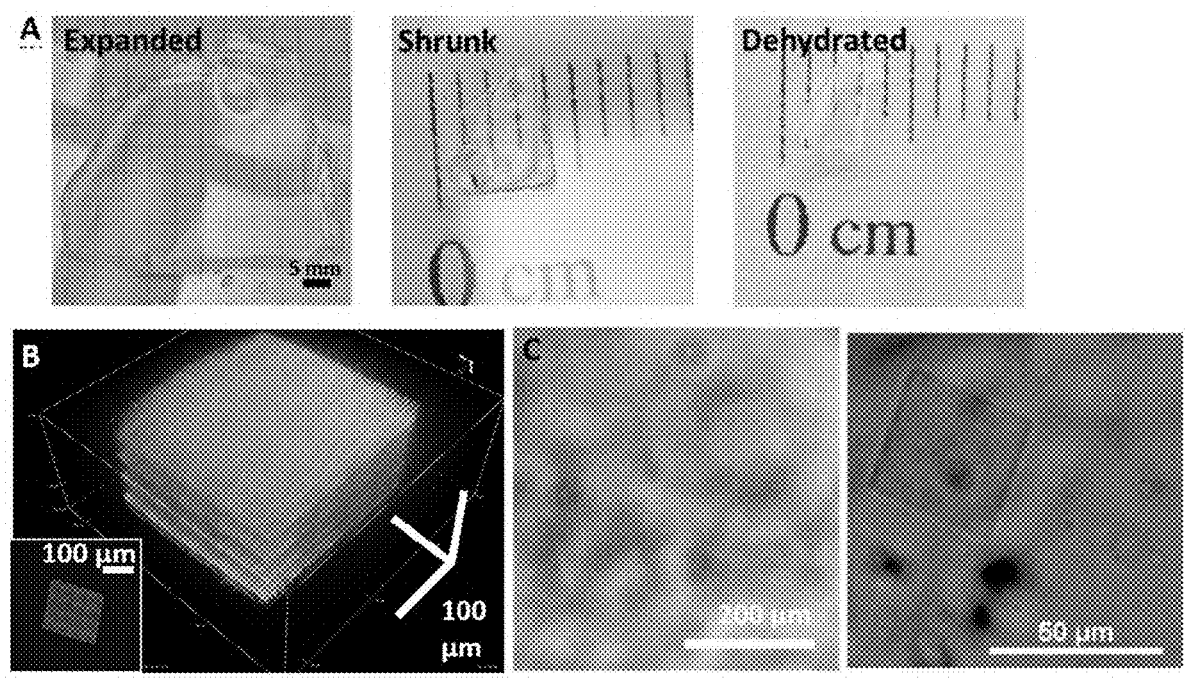
FIG. 5 shows schematic processes of expanding, shrinking and dehydrating, wherein (a) shows the schematic processes for water-swellable hydrogel: (1) expanded in pure water; (2) shrunk; (3) dehydrated; (b) shows a 3D fluorescent confocal image of Woodpile Patterned Qdot 525 in the hydrogel in pure water (Inset, 2D view); (c) shows bright field image of Woodpile Patterned 3 nm $Fe_3O_4$ nanoparticles in the hydrogel in water (left) and shrunk in 1 mM HCl (right).

FIGS. 4 and 5 present the preliminary multi-material 3D gel patterning results. FIGS. 4(a) and 4(b) present printed 2D and 3D CUHK-CMU patterns of sulfur quantum dots. FIG. 4(c) presents a fluorescence image of printed 2D patterns of fluoresce dyes. FIG. 5(a) shows example photos of a gel in different stages of the process. FIGS. 4(d), 4(e), 4(f), 5(b) and 5(c) present optical images of printed square patterns of black ink, silver nanoparticles, gold nanoparticles, quantum dots and magnetic nanoparticles, respectively. FIGS. 4(g), 4(h), and 4(i) show SEM images of a printed silver ox and a gold electrode (all with the shrinking of the hydrogel substrate). FIG. 4(j) presents a fluorescence image of printed 3D patterns of CdSe quantum dots. FIG. 4(k) presents an AFM image illustrating the surface roughness of the gold electrode in FIG. 4(h). This shows that the SSTF-based hydrogel 3D printing system is capable of creating arbitrary 3D patterns in any position on or inside the hydrogel. From the results, the inventors found that the adsorption property of laser-patterned hydrogel is durable and stable over a time of several weeks, which ensures the reliability and flexibility of the gel operation. After material deposition (absorption), the 3D structures are stable, smooth, dense, and can stand multiple rounds of chemical treatments, including cleansing with water, ethanol, IPA, and weak base or acid solutions. The inventors also found that the 3D patterns are well preserved after complete dehydration, validating the proposed printing method.

Two-photon polymerization (TPP) as the most precise 3D nano-printing method has been commercialized and extensively applied to print micron to submicron scale 3D structures, e.g., microfluidic chips, metamaterials, and photonic crystals, etc. Compared with the existing TPP systems, the hydrogel-based 3D printing methodology has the following advantages:

(a) Substantially improved fabrication resolution: the resolution of all TPP methods or systems is on the scale of 100 nm, which is limited by diffraction of light and material strength, while the method of the disclosure can increase the resolution to 10 nm (c.f., >50 nm for the ImpFab) by custom-design gels with high volume shrinkage ratio.

(b) Wide material selection options: the materials for TPP process are largely limited to polymers. In contrast, according to the disclosure, the physical material adsorption mechanism greatly extends the material deposition/fabrication options. In principle, all nanomaterials and molecules can be deposited via the platform of the disclosure as long as they can be adsorbed into the gel. For example, carbon materials, various nanoparticles, quantum dots, nanocrystals etc.

(c) Producing ultra-dense structures: it is extremely difficult to directly fabricate dense nanostructures with low surface roughness via conventional 3D nano-fabrication. To this end, extra surface treatments are required after the initial construction of 3D nano-objects. In this disclosure, the ultra-dense 3D nanostructures with high smoothness can be readily created upon the deposition (printing) of target materials, giving structures with their surface roughness lower than 7 nm.

(d) Flexibility in printing complex structures: for instance, in liquid resin-based additive manufacturing, the printing of over-hanging structures remains a challenge due to the fluid nature of polymer/solution. This will not be an issue for this invention as the hydrogel function as a mechanical scaffold to support the adsorbed materials, and thus the printed structures. As such, over-hanging/hollow structures can be directly printed in the system of the disclosure without additional supports.

The concept of ImpFab was first reported in 2018. Despite the novel design for super-resolution 3D printing and potential for multi-material printing, it suffers from several drawbacks due to its underlying mechanism, thereby limiting its broad adoption and commercialization:

(a) The original ImpFab requires fluorescent dyes as an anchoring molecule to capture target materials, and chemical reactions are required both for the bonding between the dye and gel as well as the dye and target nanomaterial. As such, the dye molecules need to be chemically designed to ensure the effective bonding, causing the method to have poor material compatibility. In contrast, this invention uses physical adsorption (enabled by the high energy density femtosecond laser) to directly deposit or anchor nanomaterials in the gel; and importantly this mechanism applies to any materials with a size smaller than ~30 nm.

(b) Due to the use of dyes as binding agents, the original ImpFab involves multi-step chemical treatments to fabricate nanostructures (e.g., chemical modification of dyes and nanoparticles, and binding of dyes). Moreover, an additional intensification treatment is necessary for chemically incompatible materials (e.g., silver). In comparison, in the method of the disclosure, a target material can be arbitrarily deposited in the gel within a single step.

(c) The original ImpFab defines 3D pattern via a point-scanning system, which is slow and of low repeatability. As the hydrogels need to be shrunk for more than 1000 times to obtain high resolution structures, the throughput is severely compromised. In this invention, a patterned femtosecond light sheet is used for pattern definition: approximately 1,000,000 voxels can be defined in each exposure, which is three orders of magnitude faster than any point-scanning system without compromising resolution. This also effectively reduces the fabrication cost by 90%.

In view of the above, the disclosure can address one or more of the aforementioned issues and generalize the hydrogel-based 3D fabrication procedure for a wide range of materials. For example, the new platform of the disclosure may have the following advantages: (1) wide material choices including metal, metal oxide, metal alloy, two dimensional materials, molecular crystal, protein, and DNA etc.; (2) simplified fabrication steps: binding agents are no longer needed; (3) high throughput enabled by the femtosecond projection system; (4) improved printing resolution of 10 nm; (5) flexibility in hydrogel selection; and (6) structural flexibility.

The market potential of this invention is immense both for industrial application and scientific research. With the femtosecond laser projection system, multi-material nanostructures with a feature size far beyond the optical diffraction limit (10 nm) can be readily created without compromising its throughput. Many novel structures and devices, e.g., metamaterial structures or an invisible cloak, predicted by the skilled in the art can be realized in life at macroscale. No other 3D nanofabrication technologies reported to date have comparable resolution, speed and material variety with this invention.

While the above embodiments have been shown and described, it will be apparent to those skilled in the art that various changes and modifications may be made without departing from the invention in its broader aspects. The appended claims, therefore, are intended to cover all such changes and modifications as they fall within the true spirit and scope of the invention.

What is claimed is:

1. A method for hydrogel-based 3D fabrication, comprising:
    patterning a hydrogel with a laser with a power density of 0.1 to 100 TW/cm$^2$ by a photo-chemical modification of the hydrogel;
    shrinking the hydrogel, then depositing and absorbing a material on the hydrogel, wherein the material is directly bonded to the hydrogel;
    dehydrating the hydrogel to produce a three-dimensional structure.

2. The method of claim 1, wherein the hydrogel is patterned with the laser with a power density of 1 to 100 TW/cm$^2$.

3. The method of claim 2, wherein the laser is a light sheet with a pulse width of 200 fs or less at a fabrication rate of 10$^7$ μm$^3$/s or higher.

4. The method of claim 1, further comprising sintering the hydrogel which has been dehydrated by photon sintering with the laser with a power density of 0.1 to 100 TW/cm$^2$ or another laser.

5. The method of claim 4, wherein the hydrogel is sintered with a light sheet with a pulse width of 200 fs or less at a fabrication rate of 10$^7$ μm$^3$/s or higher.

6. The method of claim 1, further comprising producing the hydrogel from a compound selected from the group consisting of acrylate, methacrylate, acrylamide, hyaluronic acid, gelatin and a derivative thereof.

7. The method of claim 1, wherein before patterning the hydrogel, the hydrogel is trimmed and expanded with pure water or a solution with >7 to possess the similar structure as the three-dimensional structure.

8. The method of claim 1, wherein the material is a material with a largest size of 30 nm or less.

9. The platform of claim 8, wherein the material is selected from the group consisting of a metal, a metal oxide, a metal alloy, a two-dimensional material, a carbon-based material, a biological material, a molecular crystal, a salt, an ionic liquid, a macromolecule material, a dye, and a combination thereof.

10. The method of claim 1, wherein the hydrogel which has been deposited with the material is washed and then subjected to a patterning step.

* * * * *